United States Patent [19]

Radev

[11] 4,016,747
[45] Apr. 12, 1977

[54] METHOD OF AND APPARATUS FOR CHECKING THE CYLINDRICITY OF A TEST SURFACE
[75] Inventor: Hristo Kirilov Radev, Sofia, Bulgaria
[73] Assignee: VMEI "Lenin" -NIS, Sofia, Bulgaria
[22] Filed: Mar. 17, 1976
[21] Appl. No.: 667,547
[30] Foreign Application Priority Data
Mar. 17, 1975 Bulgaria .............................. 29338
[52] U.S. Cl. .............................................. 73/37.9
[51] Int. Cl.² ................... G01B 13/16; G01B 13/19
[58] Field of Search ................... 73/37.5, 37.6, 37.9
[56] References Cited
UNITED STATES PATENTS
2,392,016  1/1946  Wattebot ............................ 73/37.9
2,726,539  12/1955  Aller ................................... 73/37.9
FOREIGN PATENTS OR APPLICATIONS
4,201  4/1970  Japan ................................. 73/37.9

Primary Examiner—S. Clement Swisher

[57] ABSTRACT

A technique for simultaneously measuring the concentricity of axially spaced cross-sectional locations of a nominally cylindrical test surface is described. A measuring cylinder is pneumatically supported coaxial with the mean axis of the test surface. A plurality of pairs of distance sensors are supported at axially spaced portions of the cylinder. Upon a rotation of the pneumatically supported reference cylinder about its axis, the successive distance readings of the sensors of each pair as such sensors come into registration with a given point on the periphery of the test surface is measured, and each such pair is then radially displaced as a unit by an amount equal to one half the difference between the distances detected by the successive sensors in the pair during the rotation. A subsequent rotation of the supported measuring cylinder about its axis causes the distance readings of the radially displaced sensors to accurately indicate the deviation from concentricity of the associated cross-section location of the test surface.

5 Claims, 3 Drawing Figures

METHOD OF AND APPARATUS FOR CHECKING THE CYLINDRICITY OF A TEST SURFACE

BACKGROUND OF THE INVENTION

The invention relates to methods of and apparatus for checking the cylindricity of test surfaces, and more particularly to methods and apparatus of such type for checking the cylindricity of a plurality of axially spaced locations of the test surface.

Techniques are known for conveniently checking the degree of runout of a nominally cylindrical surface which is otherwise regular in configuration. The degree of runout of the cylindrical surface in such regular structures, which are characterized by a substantially linear axis, can be determined as a function of the difference between the largest and smallest diameter in a given diametral plane.

Far more complicated is the problem of measuring nonregular nominally cylindrical surfaces whose degree of runout and unevenness may vary in a non-linear manner in the axial direction, whereby the determination of the degree of non-cylindricity at one cross-sectional location is non-indicative in any way of the non-cylindricity at a spaced rotation.

In order to determine the non-cylindricity at such axially spaced locations. it has been necessary in the past to electronically record profilograms of the various surface contours of the spaced locations. Such techniques, of course, are complicated and expensive, and are furthermore time-consuming because of the necessity to analyze the recorded patterns.

SUMMARY OF THE INVENTION

The measurements of non-cylindricity of axially spaced portions of a nominally cylindrical test surface may be accomplished in a direct, inexpensive and rapid manner by employing the improved technique of the invention, which employs a measuring cylinder having a reference surface which is complementary to the nominally cylindrical test surface.

In one feature of the invention, a plurality of pairs of distance sensing elements may be supported in axially spaced relation along the measuring cylinder, which may be embodied as a mandrel or sleeve depending on whether the outer or inner surface of the cylinder under test is to be monitored. Each pair of sensors are disposed in radially spaced relation in a common diametral plane of the measuring cylinder, and the distance between the diametral planes establishes the monitoring locations of the test surface.

The measuring cylinder is pneumatically supported coaxial with the mean axis of the test surface, with the reference surface of the measuring cylinder disposed in confronting relation to the test surface.

After each pair of the sensors are adjusted if necessary to yield identical reference indications, the pneumatically supported measuring cylinder is rotated on its axis to bring both sensors of each pair successively past a given common point on the confronting test surface. In order to operationally align each pair of the sensors with the mean axis of the test surface and thereby with the axis of rotation of the measuring cylinder, each such pair of sensors is radially displaced as a unit in the associated diametral plane by an amount equal to one half the difference between the distances detected by the successive sensors in the pair during the rotation. After resetting the sensors for a new "O" adjustment if desired, the measuring cylinder is then rotated again on its axis to vary the distance between each pair of the radially displaced sensors and the confronting test surface, with the indications of the sensors serving as an accurate measurement of the deviation of the associated cross-sectional location of the test surface from cylindricity.

BRIEF DESCRIPTION OF THE DRAWING

The invention is further set forth in the following detailed description taken in conjunction with the appended drawing in which.

DETAILED DESCRIPTION

Figure 1:
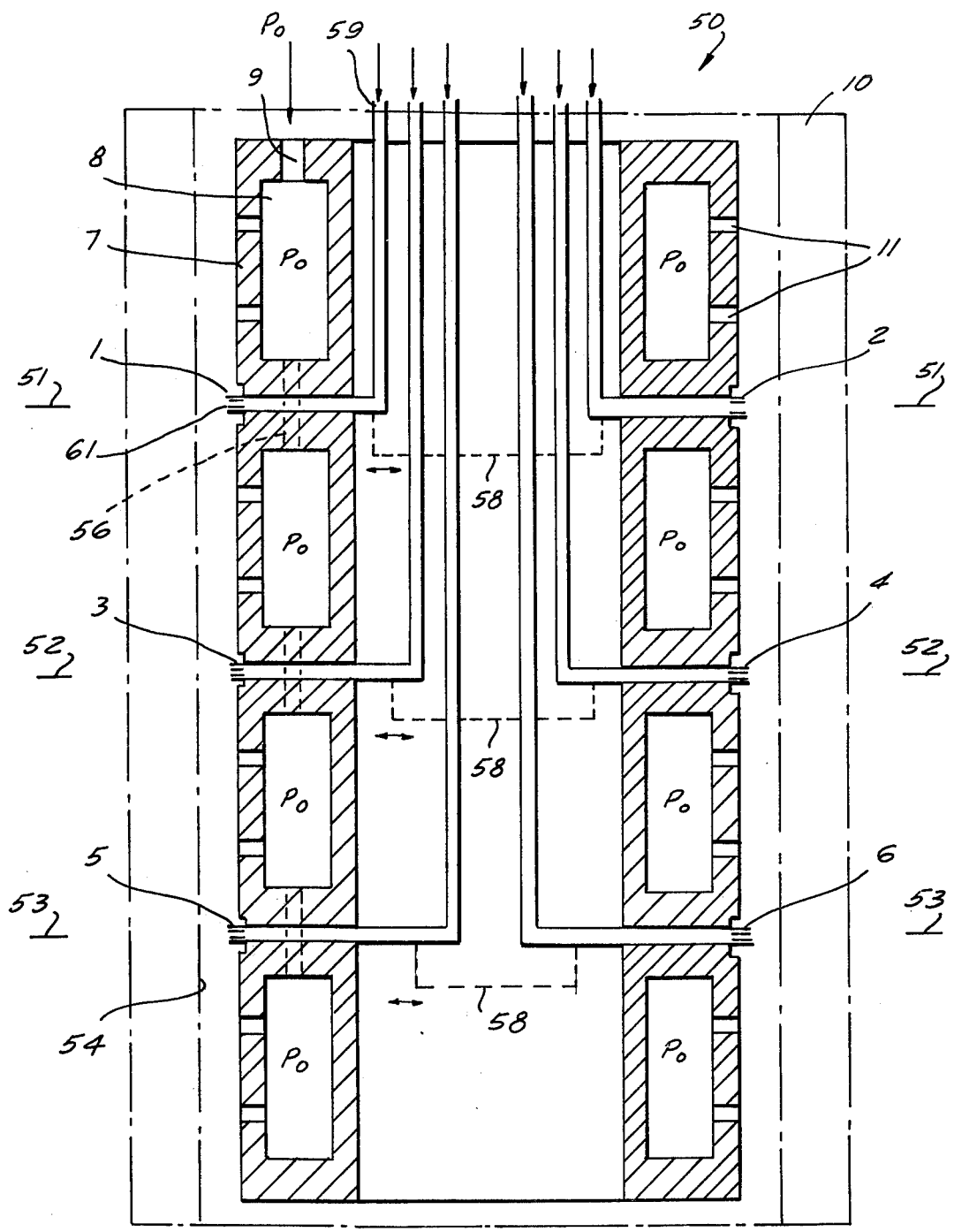
FIG. 1 is an elevation view, partially in section, of an arrangement in accordance with the invention for measuring the non-cylindricity of a plurality of axially spaced cross-sectional locations of a nominally cylindrical test surface.

Referring now to FIG. 1, the numeral 50 represents an overall arrangement for measuring the non-cylindricity at a plurality of axially spaced cross-sectional locations 51, 52 and 53 on an inner surface 54 of a test cylinder 10.

The apparatus 50 includes an accurately formed measuring cylinder 7 in the form of a hollow mandrel which is positionable within the test cylinder 10 as described below. The mandrel includes a plurality of substantially toroidal hollow chambers 8, 8, which are axially spaced as shown and which are interconnected by axial passages 56, 56. The successive passages 56 intersect the planes of the desired cross-sectional locations 51, 52 and 53 of the test cylinder 10 to be measured when the mandrel 7 is positioned therein. An outer reference surface 57 of the mandrel 7 is disposed in confronting relation to the test surface 54 to be monitored for non-concentricity.

The mandrel 7 is supported within the test cylinder 10 in order to minimize, on a "least squares" basis, the difference between the mandrel axis and the means axis of the cylinder 10. For this purpose the mandrel 7 is pneumatically supported, via an air cushion, within the interior of the cylinder 10. To accomplish this, a compressed fluid from a suitable source (not shown) is introduced into the hollow interior of the mandrel 7 via a port 9, which communicates with the upper chamber 8. The compressed fluid is effective to establish a normal super-atmospheric pressure Po within the hollow interior of the mandrel 7. Such pressure is effective to propel a continuous air stream outwardly from the mandrel 7 via a plurality of symmetrically disposed, axially and circumferentially spaced apertures 11, 11 which extend inwardly from the outer reference surface 57 of the mandrel to communicate with the pressurized chambers 8 therein. The air jets so emitted in the radially outward direction at the illustrated plurality of axially spaced locations of the mandrel is effective to accurately position the mandrel within the cylinder 10 in the manner illustrated in FIG. 1.

In further accordance with the invention and in order to individually sense a non-cylindricity of the test surface 54 at each of the axially spaced locations 51, 52 and 53, a plurality of distance sensing elements 1 – 6 are distributed in radially spaced pairs at each of the three test locations. In particular, a first pair of the distance sensors 1, 2 are supported on a mandrel 7 in radially spaced relation in alignment with the location 51; a second pair of the sensors 3, 4 are similarly supported at the locations 52; and a third pair of the sensors 5, 6 are similarly supported at the location 53. Each of the pairs of sensors is ganged via a schematically shown link 58 for radial movement as a unit in the associated diametral plane of the mandrel 7.

Each of the sensors 1 – 6 may be instrumented as a pneumatic, mechanical or electrical detector which is adapted to indicate the instantaneous distance between it and the confronting portion of the test surface 54 at the associated location. For example, each of the sensors 1 – 6 may be pneumatically instrumented as a pipe 59 which terminates in a measuring nozzle 61.

Prior to the insertion of the mandrel 7 in the test cylinder 10, each of the sensing elements 1 – 6 may be individually set to yield identical reference readings when sensing identical distances, an expedient which may illustratively be accomplished by coaxially situating the mandrel 7 within a cylindrical reference ring. Such zero setting, of course, will not be maintained when the mandrel 7 is in the position shown in FIG. 1. Such non-correspondence is illustrated in FIG. 2, wherein the solid line 62 is a typical locus of the midpoint between the sensors in each of the three pairs illustrated after their initial zero setting and prior to the insertion of the mandrel 7 into the test cylinder 10.

Figure 2:
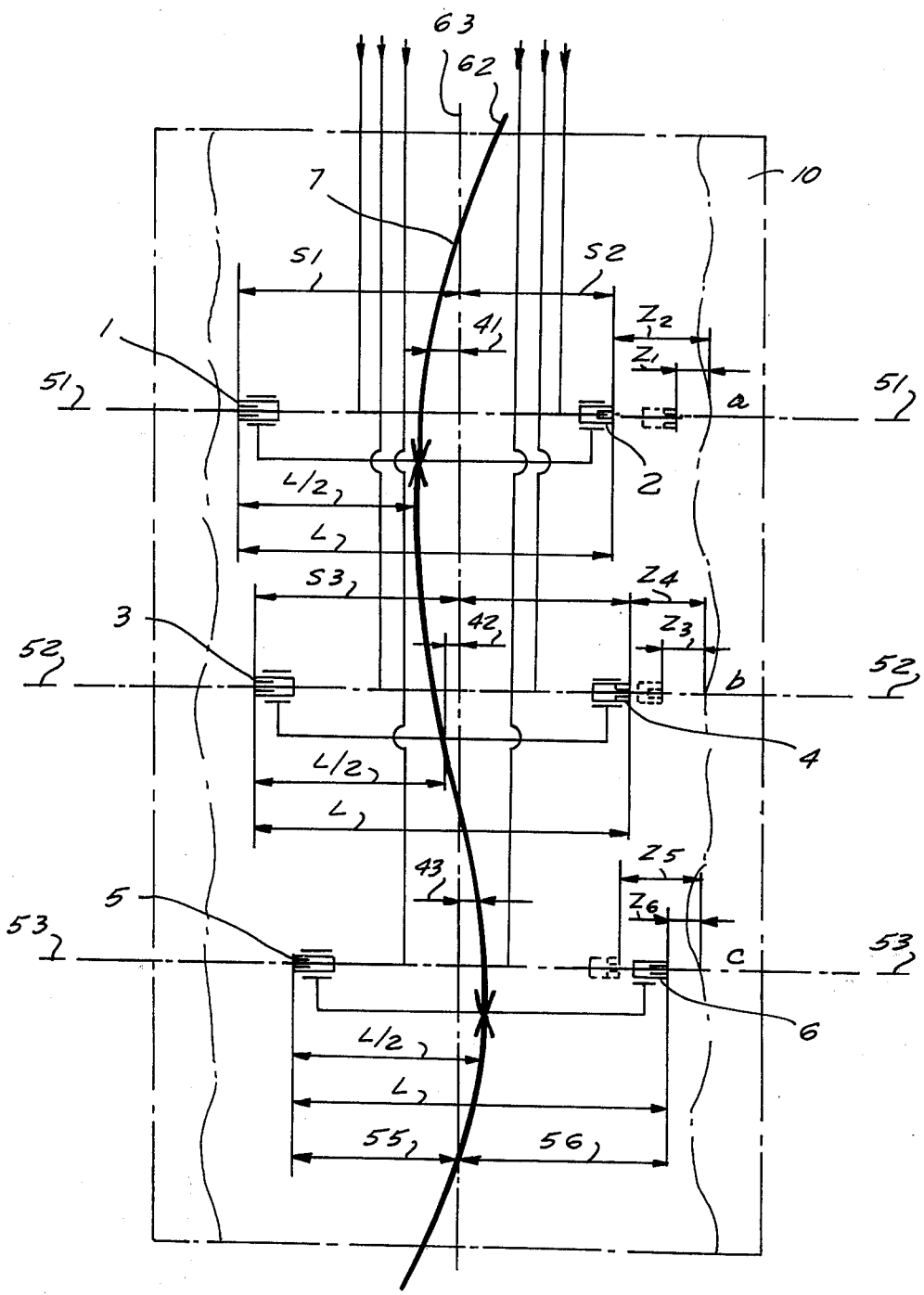
FIG. 2 is a schematic representation, keyed to the arrangement of FIG. 1, illustrating a technique for adjusting a plurality of distance sensors associated with the measuring arrangement of FIG. 1.

As shown in FIG. 2, each of the pairs of sensors 1 – 6 in the respective location 51, 52 and 53 are radially spaced by a fixed distance L whereby the initial distance between locus 62 and the effective measuring surface of each of the sensors is L/2. Since the intersection of the locus 62 with each of the measuring planes 51 – 53 will in general not coincide with the mean axis (designated 63) of the surface 10 and thereby with the axis of rotation of the mandrel 7, the rotation of the mandrel about the axis 63 past a given point in each of the planes 51 – 53 will yield different distance readings of the associated sensors. For example, the successive rotation of the sensor pair 1, 2 past the given point indicated $a$ in the plane 51 will yield a distance indication Z1 for the sensor 1 and Z2 for the sensor 2. Similarly, the rotation of the sensor pair 3, 4 past a given point marked $b$ in the reference plane 52 will yield a distance indication Z3 for the sensor 3 and Z4 for the sensor 4. In like manner, the rotation of the sensor pair 5, 6 past the given point marked $c$ in the plane 53 will yield a distance indication Z5 for the sensor 5 and Z6 for the sensor 6.

In order to adjust the radial position of the sensor pair in each measuring plane to take into account the coincidence of the mandrel axis with the mean axis 62 of the cylinder 10, each of the sensor pairs is radially displaced from their initial position by a distance equal to one half the difference between the distance indications which are sensed by each of the associated sensors as they are successively rotated into registration with the related given points of the test cylinder 10. In the case of the sensors 1 and 2, the required radial adjustment (indicated X1) is equal to one half the difference between Z2 and Z1. In the case of the sensor pair 3, 4 the required adjustment (indicated X2) is equal to one half the difference between Z3 and Z4. For the sensors 4 and 6, the required adjustment (indicated X3) is equal to one half the difference between Z5 and Z6. Once such adjustment is made, the distance S1 between the mean axis 63 and the sensor 1 will be equal to the distance S2 between the means axis 63 and the sensor 2. Moreover, because the distance between the sensors in each pair was initially set at the common distance L, the spacings S3, S4, S5 and S6 between the mean axis 63 and the respective sensors 3, 4, 5 and 6 will be equal to S1 and S2, which in turn will be equal to L/2.

Once such radial adjustments are made, each of the sensors 1 – 6 may be reset to a desired reference indication (illustratively zero), after which the mandrel 7 (FIG. 1) may again be rotated about its axis to determine the non-cylindricity at each of the planes 51, 52 and 53 by comparing the maximum and minimum readings of the associated sensor pair. In such case, a 180° rotation of the mandrel 7 is sufficient. Alternatively, by employing a 360° rotation of the mandrel, only one sensor in each of the planes 51, 52 and 53 need be activated for the final measurement.

With the arrangement described, a simultaneous indication may be obtained, without the use of complicated electronic recording techniques, of both the non-concentricity at any given cross-section of the test cylinder 10 and also the deviation of the test cylinder profile from linearity in the longitudinal direction. Moreover, the described technique is adaptable to determine the localized radius of the test surface while its concentricity is being measured.

Figure 3:
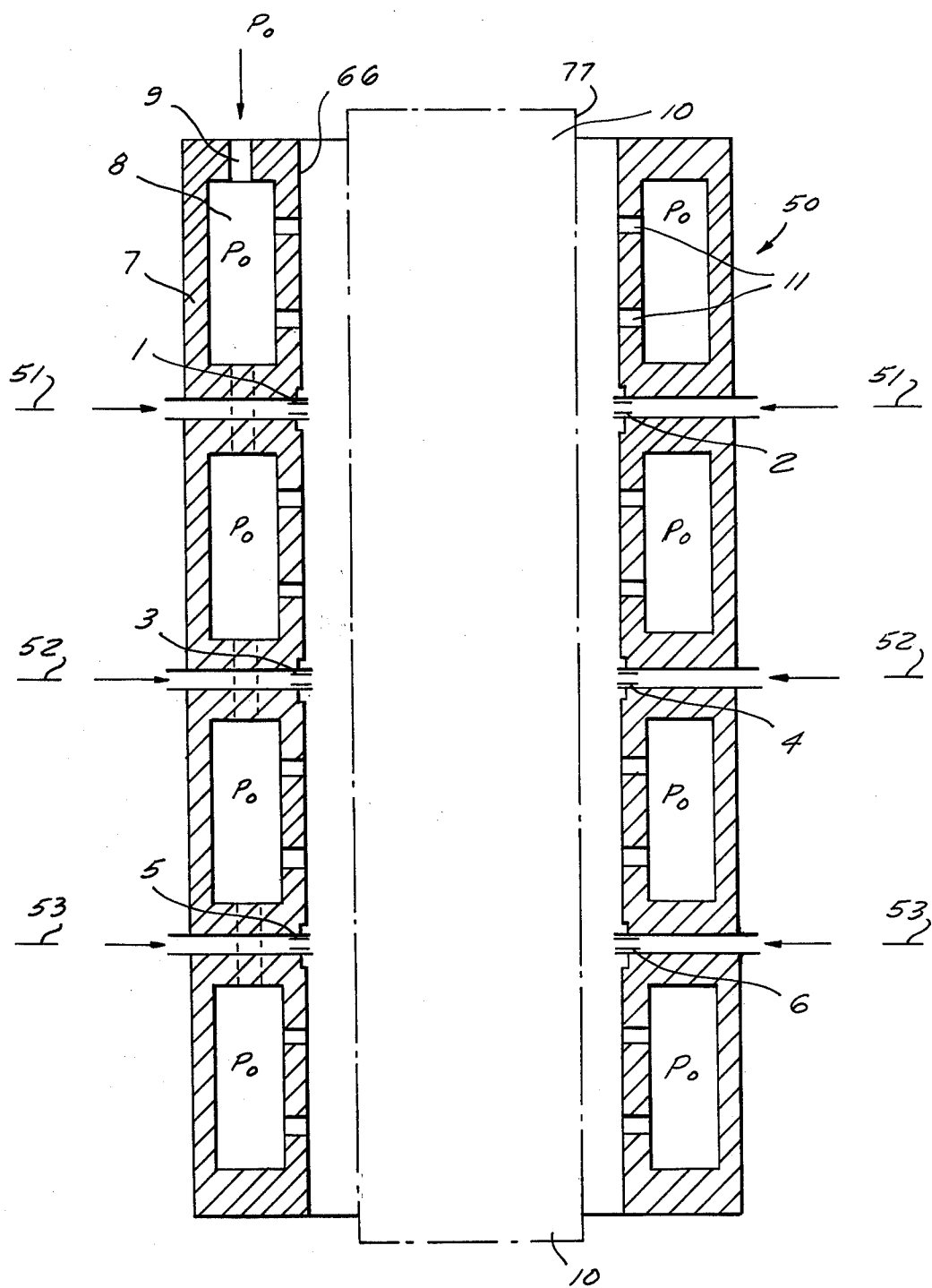
FIG. 3 is an elevational view, partially in section, of an alternative form of measuring cylinder to be employed in the general arrangement of FIG. 1 when the outer periphery, as opposed to the inner periphery, of a test cylinder is to be monitored for cylindricity.

Moreover, while the arrangement thus far described is adapted to measure the cylindricity of the internal periphery of a test cylinder, the outer periphery thereof can be tested for concentricity in an analogous manner by embodying the measuring cylinder of the test apparatus 50 as a sleeve rather than as a mandrel. This alternative is depicted in FIG. 3, wherein an inner reference surface 66 of the mandrel 7 is shown disposed in complementary relation to an outer surface 77 of the test cylinder 10 to be monitored. The manner of pneumatic support, the adjustment of the several sensors 1 – 6, and the manner of rotation of the mandrel with respect to the mean axis of the cylinder 10 is completely analogous in the arrangements of FIGS. 1 and 3.

In the foregoing, an illustrative technique and apparatus of the invention has been described. Many variations and modifications will now occur to those skilled in the art. It is accordingly desired that the scope of the appended claims not be limited to the specific disclosure herein contained.

What is claimed is:

1. In an apparatus for checking the deviation from cylindricity of each of a plurality of axially spaced cross-sectional locations of a test surface of a first cylinder having a means axis, a hollow cylindrical second cylinder having a reference surface complementary to the test surface of the first cylinder, the reference surface exhibiting a plurality of circumferentially spaced apertures extending into the hollow interior of the second cylinder, the apertures in the reference surface being symmetrically distributed about the axis of the second cylinder, means communicating with the interior of the second cylinder for propelling an air stream symmetrically out of the apertures of the reference surface to support the second cylinder coaxially with the mean axis of the first cylinder with the reference surface in confronting relation with the test surface, a plurality of distance sensing means, means for supporting the sensing means in axial spaced relation along the second cylinder to indicate the instantaneous distance between each sensing means and the confronting portion of the test surface, and means for individually adjusting the radial position of each of the sensing means with respect to the axis of the second cylinder.

2. In an apparatus for checking the deviation from cylindricity of each of a plurality of axially spaced cross-sectional locations of a test surface of a first cylinder having a mean axis, a hollow cylindrical second cylinder having a reference surface complementary to the test surface of the first cylinder, the reference surface exhibiting a plurality of circumferentially spaced apertures extending into the hollow interior of the second cylinder, the apertures in the reference surface being symmetrically distributed about the axis of the second cylinder, means communicating with the interior of the second cylinder for propelling an air stream symmetrically out of the apertures of the reference surface to support the second cylinder coaxially with the mean axis of the first cylinder with the reference surface disposed in confronting relation to the test surface, a plurality of distance sensing means, means for supporting a plurality of pairs of the sensing means in axial spaced relation along the second cylinder to indicate the instantaneous distance between each sensing means and the confronting portion of the test surface, each pair of the sensing means being radially spaced in a given diametral plane of the second cylinder, and means for adjusting the radial position of each of the pairs of sensing means as a unit with respect to the axis of the second cylinder.

3. Apparatus as defined in claim 2, in which the second cylinder is a mandrel and in which the reference surface is the outer surface of the mandrel.

4. Apparatus as defined in claim 2, in which the second cylinder is a sleeve, and in which the reference surface is the inner periphery of the sleeve.

5. In a method of checking the deviation from cylindricity at each of a plurality of axially spaced cross-sectional locations of a test surface having a mean axis, the steps of supporting a plurality of radially moveable pairs of distance sensors at axially spaced locations of a measuring cylinder having a reference surface which is substantially complementary to the test surface, each pair of sensors being disposed for radial movement as a unit in an associated diametral plane of the measuring cylinder, pneumatically supporting the measuring cylinder in coaxial relation with the mean axis of the test surface with the reference surface disposed in confronting relation to the test surface, rotating the supported measuring cylinder about its axis to bring successive sensors of each pair into registration with a given point on the opposed test surface, measuring the distance of the successive sensors in each pair from the given point during the rotation, radially displacing the position of each pair of sensors as a unit with respect to the axis of the measuring cylinder by an amount equal to one half the difference between the distances detected by the successive sensors in the pair, and rotating the supported measuring cylinder about its axis to vary the distance between each pair of the radially displaced sensors and the confronting test surface as an indication of the deviation from concentricity.

* * * * *